US012218373B2

(12) United States Patent
Yamazaki

(10) Patent No.: US 12,218,373 B2
(45) Date of Patent: Feb. 4, 2025

(54) BATTERY MODULE AND BATTERY MODULE MANUFACTURING METHOD

(71) Applicant: TOYOTA JIDOSHA KABUSHIKI KAISHA, Toyota (JP)

(72) Inventor: Nobuyuki Yamazaki, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 71 days.

(21) Appl. No.: 17/151,717

(22) Filed: Jan. 19, 2021

(65) Prior Publication Data
US 2021/0273286 A1 Sep. 2, 2021

(30) Foreign Application Priority Data
Mar. 2, 2020 (JP) .................................. 2020-035122

(51) Int. Cl.
H01M 50/289 (2021.01)
H01M 10/04 (2006.01)
H01M 50/209 (2021.01)
H01M 50/244 (2021.01)
H01M 50/293 (2021.01)

(52) U.S. Cl.
CPC ..... *H01M 50/289* (2021.01); *H01M 10/0481* (2013.01); *H01M 50/209* (2021.01); *H01M 50/244* (2021.01); *H01M 50/293* (2021.01)

(58) Field of Classification Search
CPC ........... H01M 50/20–211; H01M 50/233–244; H01M 50/249–253; H01M 50/262–264; H01M 50/269; H01M 50/289–293
See application file for complete search history.

(56) References Cited

U.S. PATENT DOCUMENTS

| 2005/0250005 A1* | 11/2005 | Bacon ................ H01M 50/105 429/66 |
| 2009/0239137 A1 | 9/2009 | Kakuchi et al. |
| 2010/0190049 A1* | 7/2010 | Kawase .............. H01M 50/209 429/159 |
| 2011/0262785 A1* | 10/2011 | Johnson ............. H01M 50/522 429/66 |

(Continued)

FOREIGN PATENT DOCUMENTS

| CN | 107210394 A | 9/2017 |
| JP | 2001-297798 A | 10/2001 |

(Continued)

OTHER PUBLICATIONS

Machine translation of Sakai et al., JP 2015-230764. Originally published Dec. 21, 2015 (Year: 2015).*

(Continued)

*Primary Examiner* — Jonathan Crepeau
*Assistant Examiner* — Jacob Buchanan
(74) *Attorney, Agent, or Firm* — Oblon, McClelland, Maier & Neustadt, L.L.P.

(57) ABSTRACT

A battery module includes a box shaped housing case that is open at an upper side, a battery stack in which plural battery cells are stacked along a horizontal direction, and that is housed inside the housing case, and plural types of shim that are made of different materials and that are disposed between the battery stack and the housing case in a state in which the battery stack is pressed along the stacking direction of the battery cells.

8 Claims, 6 Drawing Sheets

(56) References Cited

U.S. PATENT DOCUMENTS

| | | | |
|---|---|---|---|
| 2013/0295437 A1* | 11/2013 | Kreutzer | H01M 50/204 |
| | | | 429/159 |
| 2016/0093849 A1 | 3/2016 | Dekeuster et al. | |
| 2016/0344061 A1 | 11/2016 | Maguire et al. | |
| 2018/0358587 A1* | 12/2018 | Tononishi | H01M 50/291 |
| 2019/0312243 A1 | 10/2019 | Maguire et al. | |
| 2021/0083245 A1 | 3/2021 | Yamazaki et al. | |
| 2021/0273287 A1 | 9/2021 | Mizutani | |

FOREIGN PATENT DOCUMENTS

| | | | | |
|---|---|---|---|---|
| JP | 2012-243689 A | | 12/2012 | |
| JP | 2015230764 A | * | 12/2015 | ............ Y02E 60/10 |
| JP | 2017-188282 A | | 10/2017 | |
| JP | 2018-32519 A | | 3/2018 | |
| JP | 2018-49803 A | | 3/2018 | |
| JP | 2018-185949 A | | 11/2018 | |
| WO | WO 2019/151037 A1 | | 8/2019 | |

OTHER PUBLICATIONS

Office Action mailed Apr. 14, 2022 in co-pending U.S. Appl. No. 17/019,046, 13 pages.

Office Action mailed Jun. 28, 2022 in co-pending U.S. Appl. No. 17/151,728, 13 pages.

\* cited by examiner

BATTERY MODULE AND BATTERY MODULE MANUFACTURING METHOD

CROSS-REFERENCE TO RELATED APPLICATION

This application claims priority under 35 USC 119 from Japanese Patent Application No. 2020-035122 filed on Mar. 2, 2020, the disclosure of which is incorporated by reference herein in its entirety.

BACKGROUND

Technical Field

The present disclosure relates to a battery module and a battery module manufacturing method.

Japanese Patent Application Laid-Open (JP-A) No. 2018-032519 (Patent Document 1) discloses technology in which a battery module includes a box shaped module case that is open at an open upper portion and a battery stack that is housed inside the module case. Between the battery stack and the module case, a mutually opposing stack-side opposing face and case-side opposing face are each inclined at substantially the same angle as the other.

Thus, in Patent Document 1, press-fitting the battery stack into a housing section of the module case enables a restraining load to be applied to the battery stack.

However, in Patent Document 1, the restraining load (pressing force) is applied to the battery stack as a result of press-fitting the battery stack into the housing section of a housing case such as the module case as described above. Thus, variation in the pressing force might occur due to variation in the dimensions of the battery stack resulting from manufacturing tolerance.

A conceivable method to address this would be to create a gap between the housing case and the battery stack and to insert a shim (spacer) appropriate to this gap, thereby absorbing the manufacturing tolerance of the battery stack.

In such cases, the battery stack is pressed using a claw member to apply pressure in order to secure the gap, and the shim is inserted into the thus secured gap. However, in cases in which the gap is small, the shim may get in the way of the claw member, resulting in difficulty when inserting the shim into the gap.

In consideration of the above circumstances, an object of the present disclosure is to obtain a battery module and a battery module manufacturing method in which a shim can be easily inserted into a gap between a housing case and a battery stack, even in cases in which this gap is small.

Solution to Problem

A battery module of a first aspect includes a box shaped housing case that is open at an upper side, a battery stack in which plural battery cells are stacked along a horizontal direction, and that is housed inside the housing case, and plural types of shim that are made of different materials and that are disposed between the battery stack and the housing case in a state in which the battery stack is pressed along a stacking direction of the battery cells.

In the battery module of the first aspect, the battery stack in which the plural battery cells are stacked along the horizontal direction is inserted into the box shaped housing case that is open at the upper side. Moreover, in the present disclosure, the plural types of shim made of different materials are disposed between the battery stack and the housing case in a state in which the battery stack is pressed along the stacking direction of the battery cells.

Note that here, "different materials" refers to members having different mechanical properties to each other, and having different elastic moduli (variable dependencies for elastic modulus) when a condition such as temperature or pressurization speed is varied.

Accordingly, the "plural types of shim made of different materials" include not only combinations including plural types of shim configured from a resin and a metal respectively, for example, but also combinations including plural types of shim respectively configured from different metals, for example stainless steel and another steel, or combinations including plural types of shim respectively configured from different resins, for example polypropylene and nylon.

As an example of the variable dependency for elastic modulus, explanation is given regarding a case in which the elastic modulus is temperature dependent. Generally, the elastic modulus of such members decreases with increasing temperature, allowing the member to deform more readily.

For example, when metals and resins are compared, metals have higher rigidity, while having lower temperature dependency and changing less with temperature than resins. Metals therefore have greater dimensional stability. Compared to metals, resins have higher temperature dependency, and deform more readily. Resins therefore have a greater ability to absorb dimensional differences.

Accordingly, during insertion of the shims into the gap created between the housing case and the battery stack, a shim with higher dependency can be inserted into the gap by compressing the shim with higher dependency.

Accordingly, in the present disclosure, by employing a resin shim and a metal shim, for example, the resin shim deforms (undergoes compression), thereby enabling the resin shim and the metal shim to be easily inserted into the gap between the housing case and the battery stack even in cases in which this gap is small.

In a state in which the resin shim and the metal shim have been inserted into the gap, the high rigidity of the metal enables the required pressing force on the battery stack to be sufficiently obtained by the metal shim.

A battery module of a second aspect is the battery module of the first aspect, wherein the plural types of shim include members having different variable dependencies for elastic modulus.

In the battery module of the second aspect, members having different variable dependencies to each other for elastic modulus are employed as the plural types of shim. Therefore, controlling the dependent variable enables the mechanical properties of each material to be fully exploited.

Specifically, both ease of insertion of the shims during insertion of the plural types of shims into the gap between the housing case and the battery stack, and maintaining of the pressing force against the battery stack in a state in which the battery stack and the plural types of shims are housed inside the housing case, can be secured.

A battery module of a third aspect is the battery module of the second aspect, wherein the variable dependency is temperature dependency.

In the battery module of the third aspect, since the variable dependency is temperature dependency, controlling the temperature to allow the thickness of the shim to changes insertion of the shim into the gap created between the housing case and the battery stack allows the shim to deform (become thinner) easily, thus enabling the shim to be easily inserted into the gap even in cases in which the gap is small.

A battery module manufacturing method of a fourth aspect is a battery module manufacturing method for application to manufacture of the battery module of any one of the first aspect to the third aspect. The battery module manufacturing method includes a first pressing process of pressing the battery stack along the stacking direction of the battery cells, a length measuring process of measuring a dimension in the battery cell stacking direction of the battery stack that has been pressed during the first pressing process, an insertion gap derivation process of deriving an insertion gap when the battery stack is inserted into the housing case based on a result of the length measurement of the length measuring process, a selection process of selecting plural types of shim made of different materials in a case in which the insertion gap derived during the insertion gap derivation process is a threshold value or less, a second pressing process of pressing the battery stack and the plural types of shim selected during the selection process in a state in which a variable is controlled such that, from among the plural types of shim, a shim having a higher variable dependency for elastic modulus changes in thickness, and an insertion process of inserting the plural types of shim and the battery stack that have been pressed during the second pressing process into the housing case.

The battery module manufacturing method according to the fourth aspect includes the first pressing process, the length measuring process, the insertion gap derivation process, the selection process, the second pressing process, and the insertion process.

First, in the first pressing process, the battery stack is pressed along the stacking direction of the battery cells.

Next, in the length measuring process, the dimension in the battery cell stacking direction of the battery stack pressed during the first pressing process is measured.

In the insertion gap derivation process, the insertion gap when the battery stack is inserted into the housing case is derived based on the result of the length measurement of the length measuring process.

In the selection process, the plural types of shim made of different materials are selected in cases in which the insertion gap derived during the insertion gap derivation process is the threshold value or less.

In the second pressing process, the battery stack and the plural types of shim selected during the selection process are pressed in a state in which a variable is controlled such that out of the plural types of shim, the shim having the higher variable dependency for elastic modulus changes in thickness.

In the insertion process, the plural types of shim and the battery stack that have been pressed during the second pressing process are inserted into the housing case.

Note that in the second pressing process, for example, since the elastic modulus decreases with increasing temperature, thereby allowing the shim having the higher temperature dependency to deform more readily, "a variable is controlled such that the shim having the higher variable dependency for elastic modulus changes in thickness" refers to raising the temperature.

Namely, in the present disclosure, in cases in which the insertion gap derived during the insertion gap derivation process is the threshold value or less, the plural types of shim made of different materials are selected in the selection process. Then, for example, in the second pressing process the plural types of shim and the battery stack are pressed in a state in which the temperature has been raised such that, out of the plural types of shim, the shim having the higher variable dependency for elastic modulus deforms.

Accordingly, the present disclosure enables the shim having the higher variable dependency for elastic modulus to be deformed (reduced in thickness in the pressing direction), thus facilitating insertion of the plural types of shim and the battery stack into the housing case.

Moreover, inserting the plural types of shim into the gap enables the required pressing force on the battery stack to be sufficiently obtained by the shim having the lower variable dependency for elastic modulus.

In the second pressing process, "pressing the battery stack and the plural types of shim" encompasses not only cases in which the plural types of shim and the battery stack are pressed as an integral unit, but also cases in which the plural types of shim and the battery stack are pressed separately to each other.

In cases in which the plural types of shim and the battery stack are pressed as an integral unit, the pressing process is completed in a single action, and so work efficiency is greater than in cases in which the plural types of shim and the battery stack are pressed separately to each other.

However, for example, the temperatures involved in cases in which it is necessary to raise the temperature of the shims during pressing may affect the battery stack in cases in which the plural types of shim and the battery stack are handled as an integral unit. However, this issue does not arise in cases in which the plural types of shim and the battery stack are pressed separately to each other. Namely, temperature control can be performed according to the shim materials.

A battery module manufacturing method of a fifth aspect is the battery module manufacturing method of the fourth aspect, wherein in the selection process, a shim with a lower variable dependency for elastic modulus is selected in a case in which the insertion gap is greater than the threshold value.

In the battery module manufacturing method of the fifth aspect, in the selection process, the ease of insertion of the plural types of shim and the battery stack into the housing case is not an issue in a case in which the insertion gap derived during the insertion gap derivation process is larger than the threshold value.

Accordingly, in the present disclosure, the shim having the lower variable dependency for elastic modulus, namely the shim having higher rigidity, is selected in such cases. This enables the required pressing force on the battery stack to be sufficiently obtained in a state in which the shim and the battery stack are housed inside the housing case.

As described above, the battery module of the first aspect exhibits the excellent advantageous effect of enabling a shim to be easily inserted into the gap between the housing case and the battery stack, even in cases in which this gap is small.

The battery module of the second aspect exhibits the excellent advantageous effect of enabling both ease of insertion of a shim between the housing case and the battery stack, and maintaining of the pressing force with which the battery stack is pressed when housed inside the housing case, to be secured.

The battery module of the third aspect exhibits the excellent advantageous effect of enabling a shim to be easily inserted into the gap between the housing case and the battery stack, even in cases in which this gap is small.

The battery module manufacturing method of the fourth aspect exhibits the excellent advantageous effect of facilitating insertion of the plural types of shim and the battery stack into the housing case.

The battery module manufacturing method of the fifth aspect exhibits the excellent advantageous effect of enabling the required pressing force on the battery stack to be sufficiently obtained in a state in which the shim and the battery stack are housed inside the housing case.

BRIEF DESCRIPTION OF DRAWINGS

Exemplary embodiments of the present invention will be described in detail based on the following figures, wherein.

DETAILED DESCRIPTION

Figure 1:
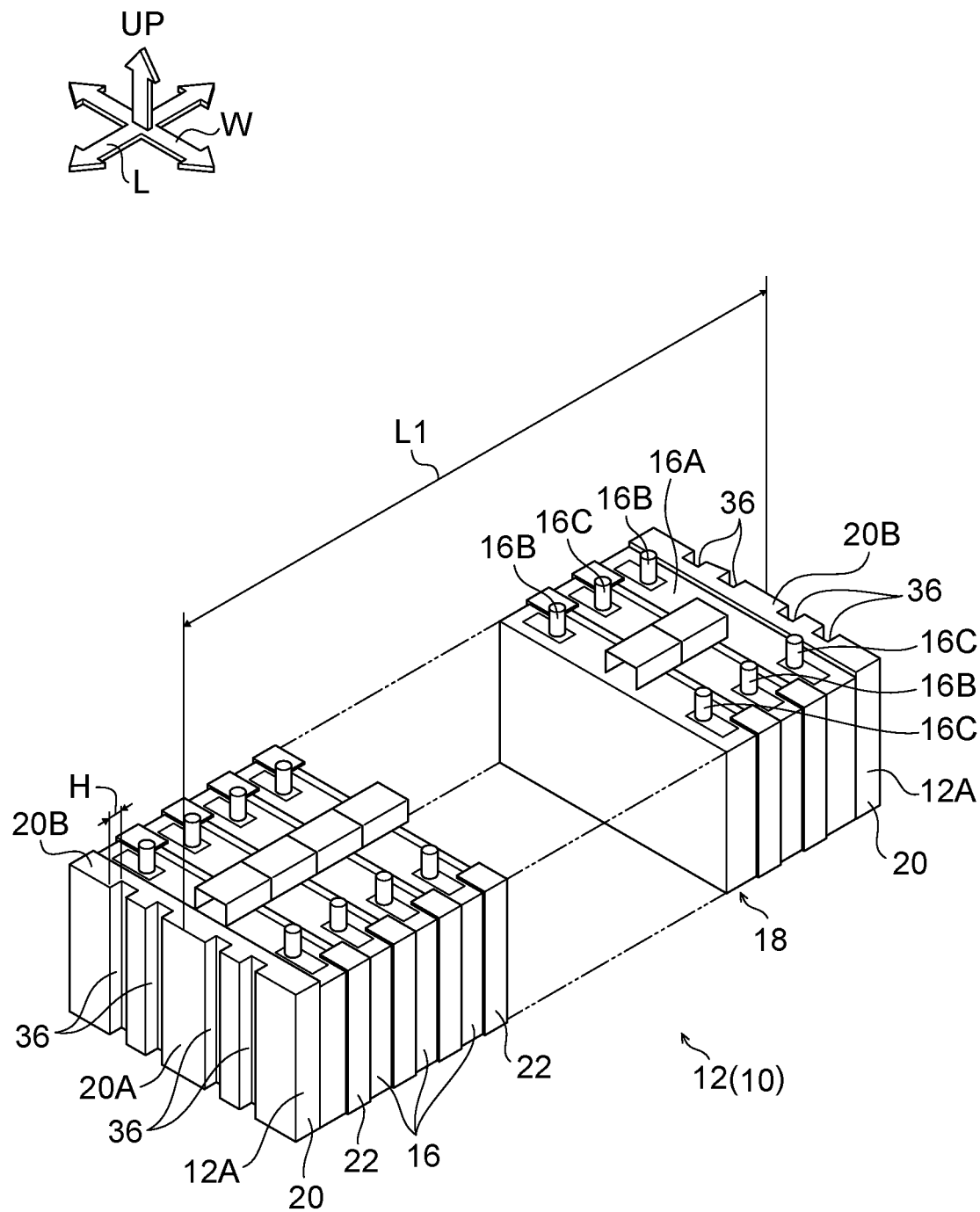
FIG. 1 is a perspective view illustrating a battery stack configuring part of a battery module according to an exemplary embodiment, as viewed obliquely from an upper side.

Explanation follows regarding a battery module 10 according to an exemplary embodiment of the present disclosure, with reference to the drawings. Note that in the drawings, the arrow UP, the arrow L, and the arrow W respectively indicate an upward direction, a length direction, and a width direction of the battery module 10 according to the present exemplary embodiment, as appropriate.

Battery Module Configuration

First, explanation follows regarding configuration of the battery module 10 according to the present exemplary embodiment of the present disclosure.

FIG. 1 is a perspective view illustrating a battery stack 12 configuring part of the battery module 10, as viewed obliquely from the upper side.

As illustrated in FIG. 1, the battery stack 12 is configured including a stacked battery body 18 in which plural battery cells 16 are stacked along a horizontal direction. The battery stack 12 is also provided with resin end plates 20 at the two ends of the stacked battery body 18 that runs along a stacking direction of the battery cells 16 (arrow L direction).

The battery stack 12 is formed in a substantially rectangular block shape with its length direction along the stacking direction of the battery cells 16. Each of the end plates 20 has a substantially rectangular plate shape with a plate thickness direction in the stacking direction. Each of the battery cells 16 is for example configured by a rechargeable battery that is capable of being charged and discharged, such as a lithium-ion rechargeable battery, and is a rectangular battery with a flattened rectangular block shape. Note that there is no limitation to a lithium-ion rechargeable battery, and other types of rechargeable battery, such as a nickel-metal hydride rechargeable battery, may be employed.

An upper face 16A of each of the battery cells 16 is provided with a positive terminal 16B and a negative terminal 16C, each having a circular column shape. The battery cells 16 are arranged with alternating orientations such that the positive terminals 16B and the negative terminals 16C thereof are arranged alternately along the length direction of the stacked battery body 18 (the stacking direction of the battery cells 16). The positive terminals 16B and the negative terminals 16C of adjacent battery cells 16 in the length direction of the stacked battery body 18 are connected together through non-illustrated busbars, these being conductive members.

The stacked battery body 18 has a configuration in which the battery cells 16 are stacked alternately with resin frames 22. Namely, in the stacked battery body 18, a resin frame 22, serving as an insulating member, is provided between each pair of adjacent battery cells 16.

The resin frames 22 are formed of a resin such as polypropylene. Battery cells 16 are arranged at the two length direction ends of the stacked battery body 18. The end plates 20, also formed of a resin such as polypropylene, are for example joined to and integrated with the battery cells 16 arranged at the two length direction ends of the stacked battery body 18.

Figure 2:
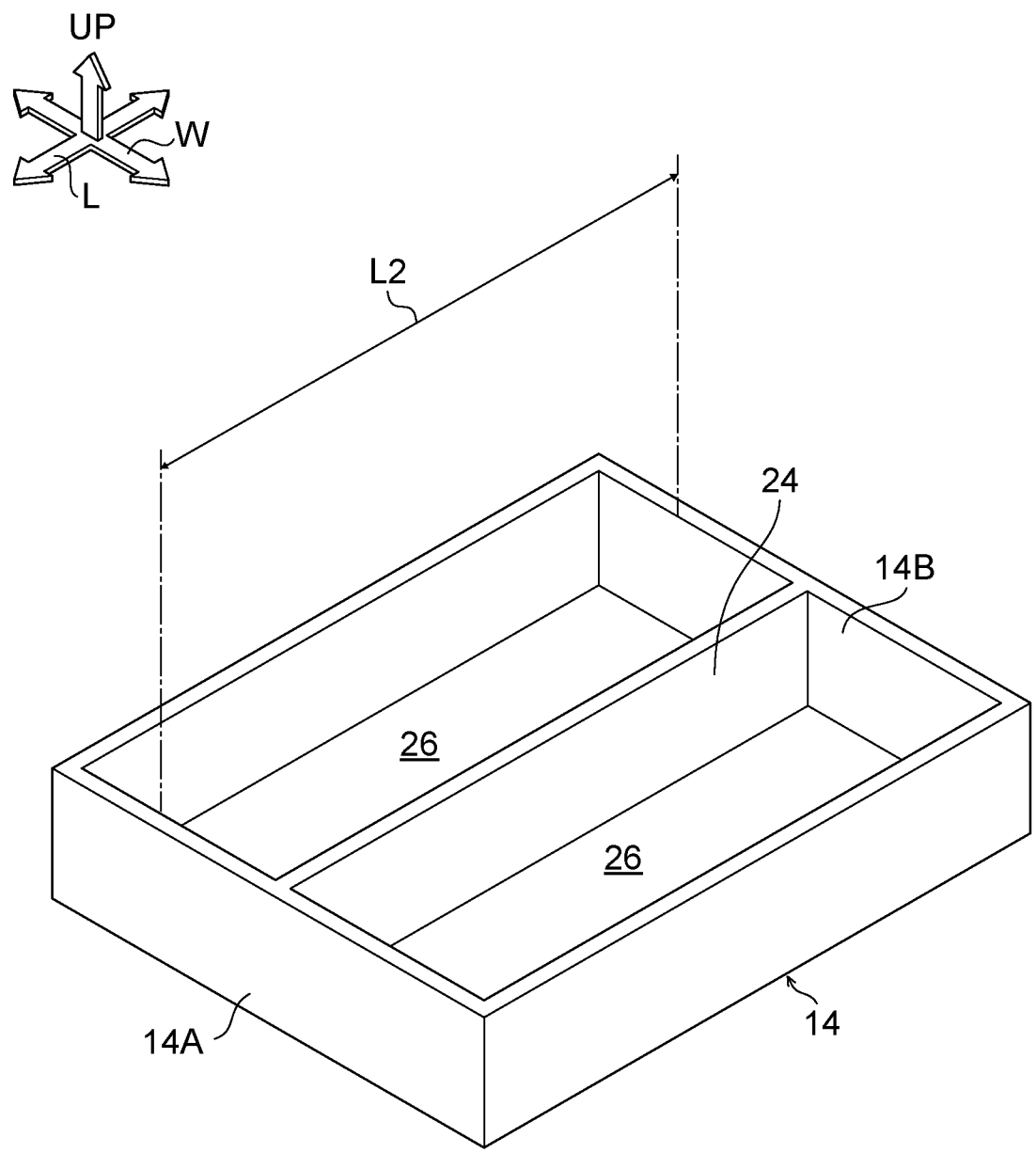
FIG. 2 is a perspective view illustrating a housing case configuring part of a battery module according to an exemplary embodiment, as viewed obliquely from the upper side.

FIG. 2 is a perspective view illustrating a housing case 14 configuring part of the battery module 10, as viewed obliquely from the upper side.

As illustrated in FIG. 2, the housing case 14 is formed in a box shape open toward the upper side, and is formed of die-cast aluminum or the like. The battery stacks 12 can be housed inside the housing case 14 (see FIG. 4).

In the present exemplary embodiment, a partition wall 24 is provided at a width direction central portion of the housing case 14. The inside of the housing case 14 is partitioned into two by the partition wall 24. Two housing sections 26 are provided as a result. The two housing sections 26 are capable of housing the battery stacks 12.

Note that the shape of the housing case 14 as illustrated has been simplified. In reality, the housing case 14 is provided with reinforcing ribs or the like to increase the inherent rigidity of the housing case 14. Moreover, in this example, two battery stacks 12 can be housed inside a single housing case 14. However, the capacity of the housing case may be increased or set such that a single battery stack is housed inside a single housing case.

Figure 4:
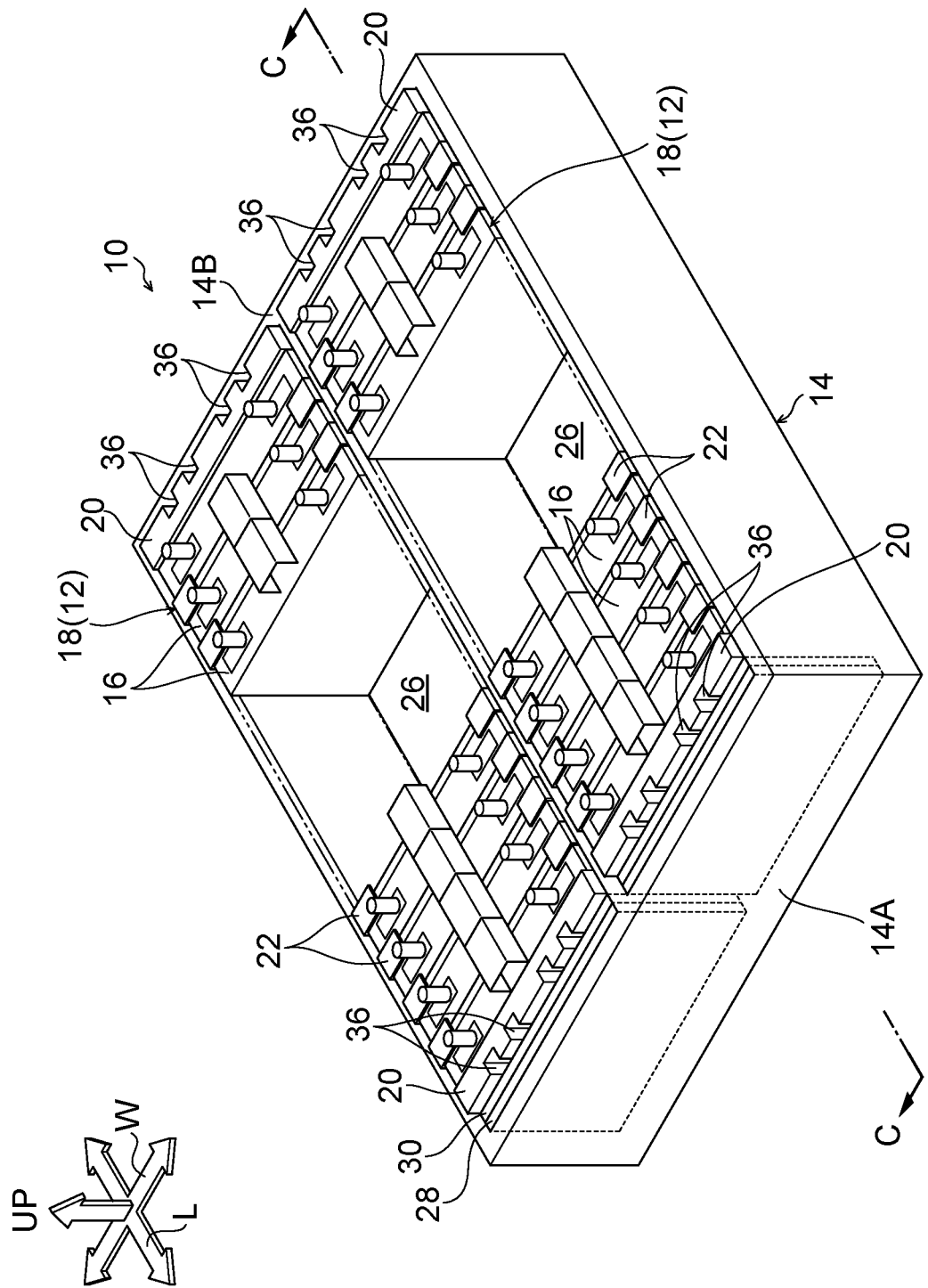
FIG. 4 is a perspective view viewed obliquely from a front side, illustrating a state in which battery stacks are housed inside a housing case configuring a battery module according to an exemplary embodiment, and shims have been inserted between the battery stacks and the housing case.

As illustrated in FIG. 4, in the present exemplary embodiment, in addition to the battery stacks 12, shims (spacers) 28, 30, described later, are also housed inside each of the housing sections 26 of the housing case 14. Although not illustrated in the drawings, cooling members such as cooling fans to cool the battery cells 16 may also be housed inside the housing sections 26 of the housing case 14 in addition to the aforementioned members.

FIG. 4 is a perspective view of the battery module 10 as viewed obliquely from the front side, illustrating a state in which the battery stacks 12 are housed inside the housing sections 26 of the housing case 14, and the shims 28, 30 have been inserted between one of the end plates 20 of the corresponding battery stack 12 and a side wall 14A of the housing case 14.

Figure 3:
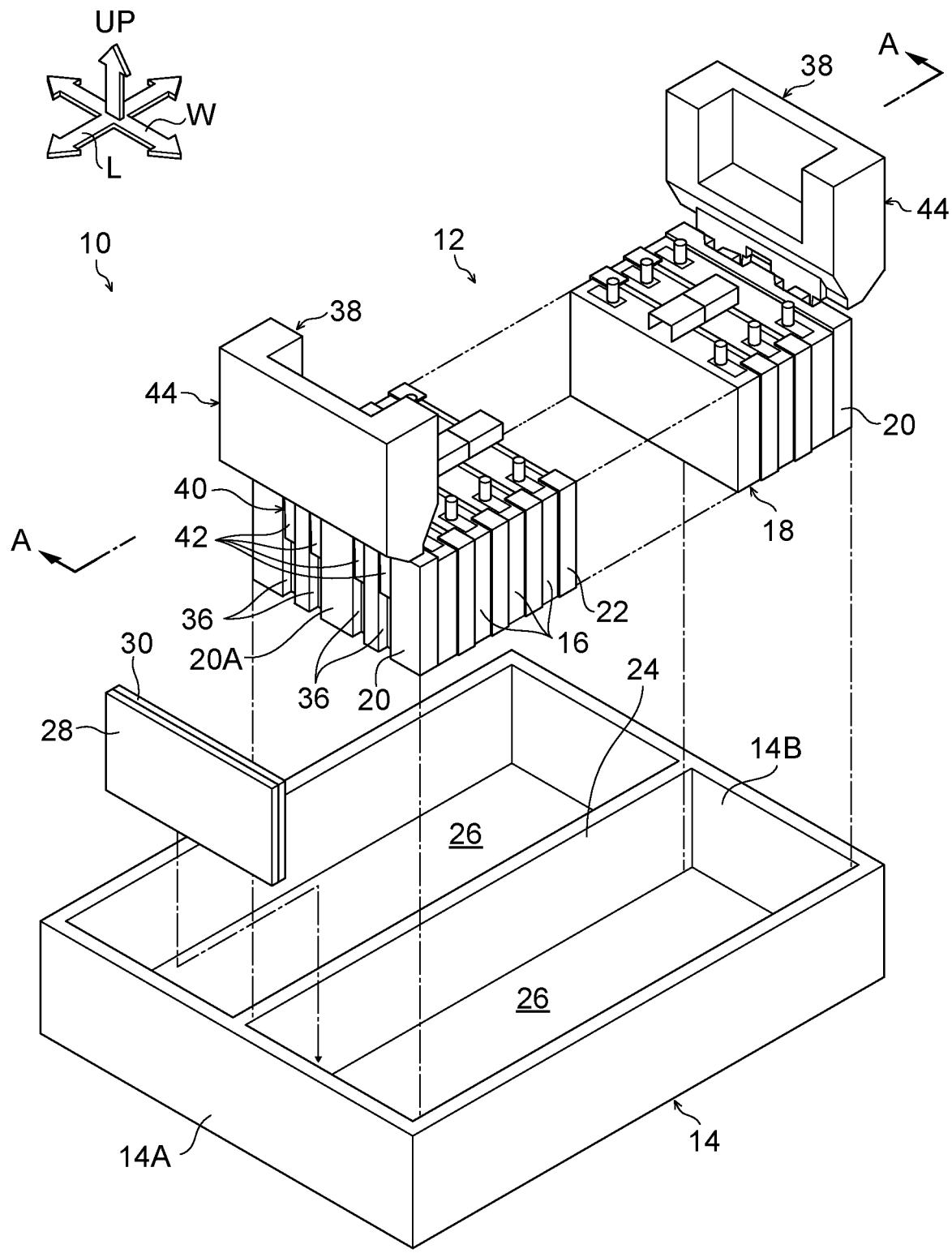
FIG. 3 is an exploded perspective view of a battery stack, shims, and a housing case configuring a battery module according to an exemplary embodiment, as viewed obliquely from a front side.

FIG. 3 is an exploded perspective view of one of the battery stacks 12, the shims 28, 30, and the housing case 14 configuring the battery module 10, as viewed obliquely from the front side.

In the present exemplary embodiment, a plate member made of resin (such as polypropylene) is employed as the shim 28, and a plate member made of metal (such as stainless steel) is employed as the shim 30 illustrated in FIG. 3.

Namely, in the present exemplary embodiment, the shim 28 and the shim 30 are made of different materials, and the resin shim 28 has a higher temperature dependency than the metal shim 30. Thus, the elastic modulus of the shim 28 with the higher temperature dependency decreases with increasing temperature, allowing the shim 28 to deform more readily.

Thus, in the present exemplary embodiment, during insertion of the shims 28, 30 into a gap (hereafter referred to as "insertion gap") created between the housing case 14 and the battery stack 12, the temperature of the shim 28 with the higher temperature dependency is raised and the shim 28 is compressed in order to facilitate insertion of the shims 28, 30 into the insertion gap.

As illustrated in FIG. 3, grooves 36 (four in this case) that run along a vertical direction from an upper end 20B of the end plate 20 are provided to an outer face 20A of each of the end plates 20.

As illustrated in FIG. 3, in the present exemplary embodiment, a pair of pressing members 38 are employed to press the battery stack 12 along the length direction (arrow L direction; stacking direction of the battery cells 16). Each of the pressing members 38 is configured including a pressing portion 44 formed in a substantially rectangular block shape tailored to the width direction (arrow W direction) dimension of the battery stack 12, and a claw portion 40 that extends downward from a lower portion of the pressing portion 44. The claw portion 40 is provided with two leg pieces 42 arranged along the width direction of the battery stack 12.

The pressing members 38 are capable of being disposed at the upper sides of the end plates 20 provided to the battery stack 12, and are capable of being moved along the length direction of the battery stack 12 in directions approaching each other. The leg pieces 42 provided to the pressing members 38 are capable of being inserted into the respective grooves 36 formed in the end plates 20 of the battery stack 12.

As a result of the pressing members 38 approaching each other in a state in which the leg pieces 42 have been inserted into the grooves 36, the battery stack 12 is pressed in the stacking direction of the battery cells 16 through the leg pieces 42, and is thereby compressed.

Operation and Advantageous Effects of Battery Module

Next, explanation follows regarding operation and advantageous effects of the battery module 10 according to the present exemplary embodiment of the present disclosure, together with an explanation regarding manufacturing processes (a manufacturing method) to manufacture the battery module 10.

Figure 5:
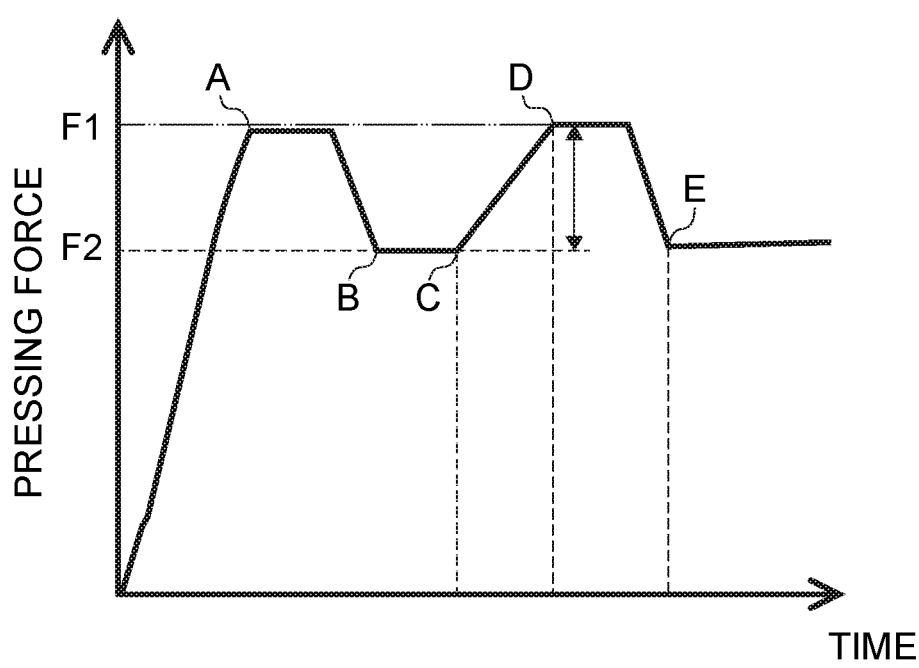
FIG. 5 is a graph illustrating a relationship between time and pressing force during manufacturing processes of a battery module according to an exemplary embodiment.
Figure 6:
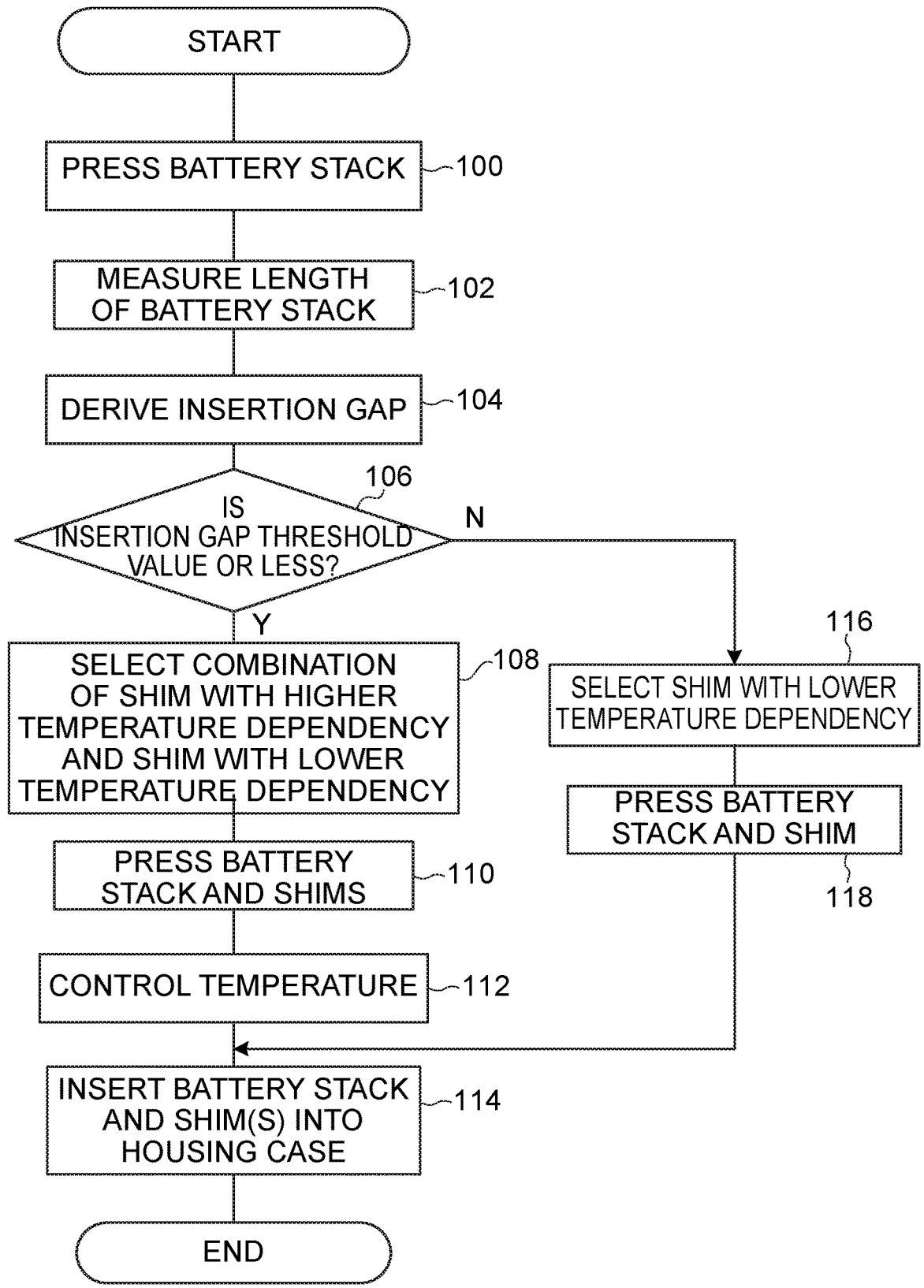
FIG. 6 is a flowchart illustrating manufacturing processes to manufacture a battery module according to an exemplary embodiment.

Explanation follows regarding the manufacturing method of the battery module 10 according to the present exemplary embodiment following the flowchart illustrated in FIG. 6 and with reference to FIG. 1 to FIG. 5. The battery module 10 according to the present exemplary embodiment is manufactured by sequentially performing a first pressing process, a length measuring process, an insertion gap derivation process, a selection process, a second pressing process, and an insertion process.

FIG. 5 is a graph illustrating a relationship between time and pressing force during the manufacturing processes of the battery module 10. FIG. 6 is a flowchart illustrating the manufacturing processes performed during manufacture the battery module 10.

Battery Stack First Pressing Process

In the manufacturing method of the battery module 10 according to the present exemplary embodiment, at step 100 in FIG. 6, the battery stack 12 is pressed (first pressing process).

In the present exemplary embodiment, first, as illustrated in FIG. 1 and FIG. 3, the plural leg pieces 42 of the claw portions 40 provided to the pressing members 38 are respectively inserted into the plural grooves 36 formed in the outer faces 20A of the end plates 20 provided at the two end portions 12A in the length direction (arrow L direction; stacking direction of the battery cells 16) of the corresponding battery stack 12.

Then, during the first pressing process of the battery stack 12 illustrated in FIG. 3, the pressing members 38 are made to approach each other so as to press the battery stack 12 along the stacking direction of the battery cells 16 (arrow L direction) at a predetermined pressing force F1 (timing A; see FIG. 5) through the leg pieces 42 of the claw portions 40 of the respective pressing members 38. The battery stack 12 is thereby compressed along the stacking direction of the battery cells 16.

The pressing force F1 on the battery stack 12 is then reduced to a pressing force F2 (timing B; see FIG. 5), and processing transitions to step 102 in FIG. 6. Note that the pressing force F2 corresponds to the required pressure on the stacked battery body 18 in the finished battery module 10 product.

Battery Stack Length Measuring Process

Next, at step 102 in FIG. 6, the length of the battery stack 12 is measured.

In the present exemplary embodiment, the battery stack 12 is pressed along the stacking direction of the battery cells 16 at the pressing force F2 during the battery stack 12 pressing process illustrated in FIG. 3. Then, after a predetermined duration has elapsed (at timing C; see FIG. 5), a length direction length (L1) of the battery stack 12 as illustrated in FIG. 1 is measured, and processing transitions to step 104 in FIG. 6. Note that the pressing members 38 illustrated in FIG. 3 are omitted from illustration in FIG. 1.

Battery Stack Insertion Gap Derivation process

Next, at step 104 in FIG. 6, the insertion gap for the battery stack 12 is derived.

In the present exemplary embodiment, in the insertion gap derivation process of the battery stack 12 illustrated in FIG. 1, first, a length direction length (L2) of the housing section 26 of the housing case 14 illustrated in FIG. 2 is measured.

Then, as illustrated in FIG. 1, a dimensional difference (L2−L1) between the length direction length (L1) of the battery stack 12 measured during the battery stack 12 length measuring process and the length direction length (L2) of the corresponding housing section 26 of the housing case 14 illustrated in FIG. 2 is used to derive the insertion gap that will arise between the housing case 14 and the battery stack 12 when the battery stack 12 is inserted into the housing case 14. Processing then transitions to step 106 in FIG. 6.

Shim Selection Process

Next, at step 106 in FIG. 6, determination is made as to whether or not the insertion gap derived during the insertion gap derivation process is a threshold value or less.

In cases in which determination is made that the insertion gap created between the housing case 14 and the battery stack 12 is the threshold value or less at step 106 in FIG. 6, processing transitions to step 108. At step 108, a combination of a shim 28 with a relatively high temperature dependency and a shim 30 with a lower temperature dependency is selected, and processing transitions to step 110.

In cases in which the insertion gap is determined to be greater than the threshold value at step 106 in FIG. 6, processing transitions to step 116. At step 116, a shim 30 with a relatively low temperature dependency is selected, and processing transitions to step 118.

Battery Stack Second Pressing Process

Next, at step 110 in FIG. 6, the battery stack 12 and the shims 28, 30 are pressed (second pressing process).

As illustrated in FIG. 3, in the second pressing process of the battery stack 12, the pressing members 38 are made to approach each other in a state in which the plural leg pieces 42 of the claw portions 40 have been respectively inserted into the plural grooves 36 formed in the outer faces 20A of the end plates 20 provided to the two end portions 12A in the length direction of the battery stack 12.

The battery stack 12 is again pressed along the stacking direction of the battery cells 16 (arrow L direction) at the predetermined pressing force F1 (timing D; see FIG. 5) through the leg pieces 42 of the claw portions 40 of the pressing members 38. Processing then transitions to step 112 in FIG. 6.

Note that the shims 28, 30 are pressed together with the battery stack 12 at step 110 in FIG. 6. The shims 28, 30 may be pressed as an integral unit with the battery stack 12, or may be pressed separately to the battery stack 12.

In cases in which the shims 28, 30 are pressed as an integral unit with the battery stack 12, the pressing process is completed in a single action, and so work efficiency is greater than in cases in which the shims 28, 30 are pressed separately to the battery stack 12.

At step 112 in FIG. 6, the temperature is controlled while the shims 28, 30 are being pressed. As previously described, a combination of a shim 28 with a higher temperature dependency and a shim 30 with a lower temperature dependency have been selected at step 108 in FIG. 6, and at step 112 the shims 28, 30 are heated while pressing the shims 28, 30. Namely, the shims 28, 30 are heated while in a pressed state. Processing then transitions to step 114 in FIG. 6.

In the present exemplary embodiment, since the shim 28 has a higher temperature dependency and the shim 30 has a lower temperature dependency, when the shims 28, 30 are heated while in a pressed state, the shim 28 deforms (is compressed) such that its plate thickness is reduced. This facilitates insertion of the shims 28, 30 into the insertion gap created between the housing case 14 and the battery stack 12.

In the present exemplary embodiment, the shims 28, 30 are heated while in a pressed state as described above. Depending on the heating temperature, the battery stack 12 may be affected in cases in which the shims 28, 30 and the battery stack 12 are handled as an integral unit. In such cases, it is preferable for the shims 28, 30 to be pressed and applied with heat separately to the battery stack 12. Namely, the pressing method of the shims 28, 30 and the battery stack 12 may be varied as appropriate according to conditions applied during the manufacturing processes.

At step 118 in FIG. 6, the battery stack 12 and the shim 30 are pressed (a second pressing process). However, since the shim 30 has relatively low temperature dependency, the temperature is not controlled during this pressing.

Shim Insertion Process

Next, at step 114 in FIG. 6, the battery stack 12 and the shim 28 and/or 30 are inserted into the housing case 14.

As illustrated in FIG. 3, during the insertion process of the shims 28, 30, the shims 28, 30 are applied with heat, after which the shims 28, 30 are inserted between the housing case 14 and the battery stack 12 in a state in which the battery stack 12 and the shims 28, 30 are being pressed along the stacking direction of the battery cells 16.

As previously described, the shim 28 has a higher temperature dependency and the shim 30 has a lower temperature dependency. Thus, when the shims 28, 30 are applied with heat in a state in which the shims 28, 30 are being pressed, the shim 28 is compressed and its plate thickness is reduced. Thus, in the present exemplary embodiment, even in cases in which the insertion gap created between the housing case 14 and the battery stack 12 is small, the shims 28, 30 can easily be inserted into this insertion gap as a result of the deformation (compression) of the shim 28.

Thus, in the present exemplary embodiment, disposing the shims 28, 30 in the insertion gap created between the battery stack 12 and the housing case 14 enables the battery stack 12 to be pressed by the shims 28, 30 at the predetermined pressing force F2 along the stacking direction of the battery cells 16 (timing E; see FIG. 5).

Note that due to the high rigidity of metal, disposing the metal shim 30 in the insertion gap enables the required pressing force on the battery stack 12 to be maintained.

Namely, in the present exemplary embodiment, due to employing members (the resin shim 28 and the metal shim 30) that have different elastic modulus temperature dependencies, controlling the temperature enables the mechanical properties of each material to be fully exploited.

Specifically, in the present exemplary embodiment, both ease of insertion of the shims 28, 30 during insertion of the shims 28, 30 into the insertion gap created between the battery stack 12 and the housing case 14, and maintaining of the pressing force with which the battery stack 12 is pressed in a state in which the battery stack 12 and the shims 28, 30 are housed inside the housing case 14, can be secured.

Supplementary Explanation of Exemplary Embodiment

Although two shims, these being the resin shim 28 that has a relatively high temperature dependency and the metal shim 30 that has a lower temperature dependency, are employed in the present exemplary embodiment, there is no limitation to two shims being inserted into the insertion gap created between the housing case 14 and the battery stack 12, and there is also no limitation to the combination of a resin shim and a metal shim.

Although members that have different temperature dependencies as a variable dependency have been selected for the shims in the present exemplary embodiment, it is sufficient that the elastic modulus be varied by changing a condition, and so there is no limitation thereto. For example, members with elastic moduli (damping attenuation rates) that differ according to the pressurization speed when the shims are pressed may be selected.

Although an example of an exemplary embodiment of the present disclosure has been given above, various modifications to the present disclosure may be implemented within a range not departing from the spirit of the present disclosure. Obviously the scope of rights of the present disclosure is not limited by the above exemplary embodiment.

What is claimed is:

1. A battery module manufacturing method to manufacture a battery module comprising a box-shaped housing case that is open at an upper side; a battery stack in which a plurality of battery cells are stacked along a horizontal direction, and that is housed inside the housing case, the battery stack including resin frames between each adjacent pair of the battery cells and resin end plates at respective ends of the battery stack; and a plurality of types of shim that are plate shaped, made of different materials from each other, and stacked in a stacking direction of the battery cells between at least one of the resin end plates and the housing case in a state in which the battery stack is pressed along the stacking direction, at least one of the plurality of types of shim contacting the at least one of the resin end plates, the battery module manufacturing method comprising a first pressing process of pressing the battery stack along the stacking direction of the battery cells;

a length measuring process of measuring a dimension in the stacking direction of the battery cells that has been pressed during the first pressing process;

an insertion gap derivation process of deriving an insertion gap when the battery stack is inserted into the housing case based on a result of the dimension of the length measuring process;

a selection process of selecting a plurality of types of shim made of different materials only in a case in which the insertion gap derived during the insertion gap derivation process is a threshold value or less;

a second pressing process of pressing the battery stack and the plurality of types of shim selected during the selection process in a state in which a variable is controlled such that, from among the plurality of types of shim, a shim having a relatively higher variable dependency for elastic modulus changes in thickness among the plurality of types of shim; and an insertion process of inserting the plurality of types of shim and the battery stack that have been pressed during the second pressing process into the housing.

2. The battery module manufacturing method of claim 1, wherein the plurality of types of shim include members having a different variable dependency for elastic modulus.

3. The battery module manufacturing method of claim 2, wherein the variable dependency is temperature dependency.

4. The battery module manufacturing method of claim 2, wherein the plurality of types of shim include
   a first shim type having a first elastic modulus that decreases at a first rate in accordance with an increase in temperature, and
   a second shim type having a second elastic modulus that decreases at a second rate in accordance with the increase in temperature, the first rate being higher than the second rate.

5. The battery module manufacturing method of claim 1, wherein, in the selection process, a shim with a relatively lower variable dependency for elastic modulus among the plurality of types of shim is selected in a case in which the insertion gap is greater than the threshold value.

6. The battery module manufacturing method of claim 1, wherein the plurality of types of shim include a first member made of resin and a second member made of metal.

7. The battery module manufacturing method of claim 1, wherein the resin frames are insulating members provided between the battery cells.

8. The battery module manufacturing method of claim 1, wherein the plurality of types of shim are stacked between the at least one of the resin end plates and a side wall of the housing case.

* * * * *